US007067802B1

(12) United States Patent
Kovtoun

(10) Patent No.: US 7,067,802 B1
(45) Date of Patent: Jun. 27, 2006

(54) GENERATION OF COMBINATION OF RF AND AXIAL DC ELECTRIC FIELDS IN AN RF-ONLY MULTIPOLE

(75) Inventor: Viatcheslav V. Kovtoun, Santa Clara, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 11/056,547

(22) Filed: Feb. 11, 2005

(51) Int. Cl.
*B01D 50/44* (2006.01)
*H01J 49/00* (2006.01)

(52) U.S. Cl. ...................... 250/282; 250/292; 250/280; 250/288; 250/283; 250/281

(58) Field of Classification Search ................ 250/292, 250/288, 281, 282, 287
See application file for complete search history.

(56) References Cited

U.S. PATENT DOCUMENTS 5,464,975 A * 11/1995 Kirchner et al. ............ 250/283
5,572,035 A 11/1996 Franzen
5,811,800 A * 9/1998 Franzen et al. ............. 250/288
5,847,386 A * 12/1998 Thomson et al. ........... 250/288
6,111,250 A * 8/2000 Thomson et al. ........... 250/282
6,559,444 B1 5/2003 Franzen
6,674,071 B1 * 1/2004 Franzen et al. ............. 250/292
6,803,565 B1 10/2004 Smith et al.
6,891,153 B1 * 5/2005 Bateman et al. ............ 250/281
2001/0054685 A1 12/2001 Franzen
2002/0027196 A1 3/2002 Shiokawa

* cited by examiner

*Primary Examiner*—Nikita Wells
*Assistant Examiner*—Johnnie L Smith, II
(74) *Attorney, Agent, or Firm*—Charles B. Katz

(57) ABSTRACT

An RF-only multipole includes a spiral resistive path formed around each multipole rod body. RF voltages are applied to the rod body and resistive path, and DC voltages are applied to the resistive path, to create a radially confining RF field and an axial DC field that assists in propelling ions through the multipole interior along the longitudinal axis thereof. In one implementation, the resistive path takes the form of a wire of resistive material, such as nichrome, which is laid down in the groove defined between threads formed on the rod body. The RF-only multipole of the invention avoids the need to use auxiliary rods or similar supplemental structures to generate the axial DC field.

22 Claims, 7 Drawing Sheets

100

GENERATION OF COMBINATION OF RF AND AXIAL DC ELECTRIC FIELDS IN AN RF-ONLY MULTIPOLE

FIELD OF THE INVENTION

The present invention relates generally to the field of mass spectrometers, and more specifically to RF-only multipole structures used in mass spectrometers.

BACKGROUND OF THE INVENTION

RF-only multipole structures are widely used in mass spectrometers as ion guides and/or collision cells. Generally described, RF-only multipoles consist of four or more elongated rods that bound an interior region through which ions are transmitted. The ions enter and exit the multipole rod set axially. A radio-frequency (RF) voltage is applied to opposed rod pairs to generate an RF field which confines the ions radially and prevents ion loss arising from collision with the rods. RF-only multipoles are operationally distinguishable from standard quadrupole mass filters, which utilize a DC electric field component in the radial plane to enable separation of ions according to mass-to-charge (m/z) ratio; as the name denotes, RF-only multipoles omit the DC field component in the radial plane and thus allow passage of ions having differing m/z ratios.

In many mass spectrometers, the ion source (such as an electrospray ionization (ESI) source, an atmospheric pressure chemical ionization (APCI) sources, as well as certain types of matrix-assisted laser desorption ionization (MALDI) sources) operates at a significantly higher pressure relative to the pressure in the mass analyzer region. Due to collisional damping effects (which reduce the kinetic energy of ions within the multipole) it may be desirable or necessary to provide an axial DC field in an RF-only multipole located in a high-pressure or intermediate-pressure region to assist in propelling the ions along the longitudinal axis of the multipole. Generation of the axial DC field is commonly achieved by using (i) segmented RF-only multipoles with variable DC offset voltage between segments; (ii) tilted or shaped appropriately auxiliary metal rods positioned in gaps between RF rods; or, (iii) a set of supplemental auxiliary rods (metal segments or isolator covered with resistive material), located between the main RF rods and being arranged substantially parallel thereto. In the last case, an axial DC potential gradient is created by applying a first voltage to corresponding first ends of the auxiliary rods and a second voltage to corresponding second (opposite) rod ends. The use of auxiliary rods and related techniques for generating an axial DC field in RF-only multipoles is disclosed in, for example U.S. Pat. No. 6,111,250 by Thomson et al., entitled "Quadrupole with Axial DC Field."

The implementation of auxiliary rods in RF-only multipoles is often problematic and may complicate the operation and/or compromise the performance of mass spectrometers. A notable operationally significant problem is that the DC potential in the radial plane orthogonal to the major longitudinal axis of the multipole may vary significantly with angular and radial position, being dependent upon the geometry of both rod sets and the differences in DC voltages applied. Poor homogeneity of DC potential may adversely affect ion transmission efficiency, especially when large excursion of ion trajectories from the major longitudinal axis occur. Additionally, the presence of the auxiliary rod set may interfere with the optical pathway of the laser beam used to desorb and ionize the sample. In view of these problems and disadvantages, there is a need in the art for an improved technique for providing an axial DC field in an RF-only multipole.

SUMMARY

In accordance with a first aspect of the invention, an RF-only multipole is constructed from at least four elongated conductive rods held in spaced apart, mutually parallel relation. Each rod has arranged on its outer surface a spiral-shaped resistive path. The resistive path may be implemented as a wire of resistive material that is laid down in a spiral groove defined between threads formed on the surface of the rod. An isolating layer may be interposed between the wire and the electrically conductive rod to electrically isolate the wire from the rod. RF voltages may be applied to the RF rod body and both terminals of the wire through the capacitive coupling to the wire to create an RF electric field that radially confines ions traveling through the interior of the multipole. An axial DC field is established by applying first and second DC voltages across the wire. The resultant axial DC field assists in propelling ions along the longitudinal axis of the multipole and avoids the use of auxiliary rods and their attendant problems.

According to another aspect of the invention, a mass spectrometer system is provided having an RF-only multipole of the above general description to guide ions along a segment of a path extending between an ion source and a mass analyzer. In a particular implementation, the ion source is a MALDI ion source, and the laser beam path projects through the interior region of the RF-only multipole. The laser beam may enter the interior region through a gap between adjacent rods. In contradistinction, the placement of auxiliary rods or other supplemental structures in prior art ion guides block passage of the laser beam into the interior region, thereby necessitating forming an aperture in one of the RF rods to allow the beam to enter the interior or delivering the laser beam into the space between the multipole and the sample plate. The latter approach limits the available range of incidence angles of the laser beam and geometry of the spot.

DETAILED DESCRIPTION OF EMBODIMENTS

Figure 1:
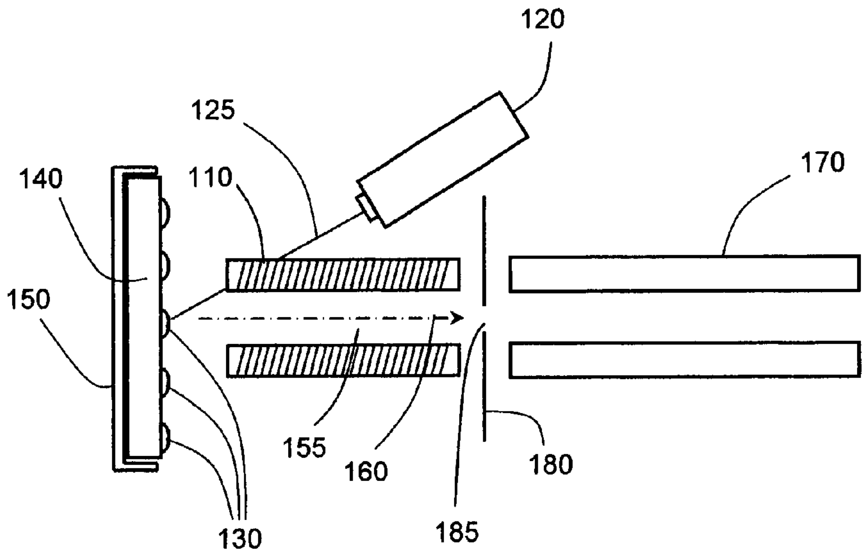
FIG. 1 is a schematic diagram of a MALDI ion source mass spectrometer including an RF-only collisional multipole constructed in accordance with an embodiment of the invention and positioned to transfer ions generated at the sample plate.

FIG. 1 is a schematic depiction of a MALDI mass spectrometer 100 that includes an RF-only multipole 110 constructed in accordance with an embodiment of the invention. It should be understood that mass spectrometer 100 is merely an illustrative example of an environment in which RF-only multipole 110 may be advantageously utilized, and that presentation of this example should not be construed as limiting RF-only multipole 110 to use in MALDI systems or other particular instruments or environments.

As depicted in FIG. 1, a laser 120 is positioned to direct a pulsed beam of radiation 125 onto a sample 130 disposed on sample plate 140. A translatable sample plate holder 150 carries sample plate 140 and is configured to align selected portions of sample 130 with radiation beam 125. Sample 130 will typically take the form of a crystal in which molecules of one or more analyte substances are contained, together with molecules of a material that is highly absorbent at the radiation beam 125 wavelength. Some of the energy of radiation beam 125 is absorbed by sample 130, causing a portion of the analyte molecules to be desorbed from sample 130 and ionized.

Analyte ions ejected from the sample plate are transferred into an interior region 155 of RF multipole 110 through an entry end thereof and travel along major or longitudinal axis 160 under the influence of a DC field to the exit end of multipole 110. As will be discussed below in connection with FIGS. 2–6, RF-only multipole 110 may be constructed from a plurality of parallel elongated rods each having a spiral resistive path arranged thereon to which DC and RF voltages are applied for generation of the radial RF and axial DC fields. The RF field operates to constrain movement of the ions in the radial dimensions (i.e., in the plane orthogonal to major axis 160). Collisional focusing of ions may also assist to maintain the ions in a region close to the major axis such that the ions may be efficiently transferred through the orifice plates or central passageways of ion optics located downstream of the multipole.

It should be noted that certain instrument geometries may dictate that radiation beam 125 projects through at least a portion of interior region 155, as depicted in FIG. 1. If gaps between rods are obscured by auxiliary rods or other supplemental structures used to generate the axial DC field, instrument designers have found it necessary to adapt one or more rods of the RF-only multipole with apertures that allow passage therethrough of radiation beam 125. The presence of these apertures may cause irregularities in the RF and DC fields that adversely affect or complicate the operation of mass spectrometer 100.

Mass analyzer 170 may be a linear ion trap, quadrupole, time-of-flight (TOF) analyzer, or any other suitable structure capable of separating and detecting ions according to their mass-to-charge (m/z) ratios. An orifice plate 180 (or a series of orifice plates), having an orifice 185 to allow passage of ions therethrough will typically be placed in the ion pathway between RF-only multipole 110 and mass analyzer 170 to allow development of the requisite low pressures in the chamber in which mass analyzer 170 is located. In addition, one or more intermediate chambers of successively lower pressure(s) may be disposed in the ion pathway in order to reduce pumping requirements. We note that the housings, enclosures and other structures that enclose and define the various chambers of mass spectrometer 100 have been omitted from FIG. 1 for the purposes of clarity and brevity. Those skilled in the art will recognize that additional ion optic elements, such as electrostatic lenses, ion guides, skimmers, and the like, may be disposed along the ion pathway to direct and/or focus the ions, and that such elements may be positioned either upstream or downstream of RF-only multipole 110.

While RF-only multipole 110 is described above in terms of its implementation as an ion guide, it should be understood that this implementation is illustrative rather than limiting and that RF-only multipoles of the nature and description set forth below may be utilized as collision or reaction cells or for other suitable applications and purposes.

Figure 2:
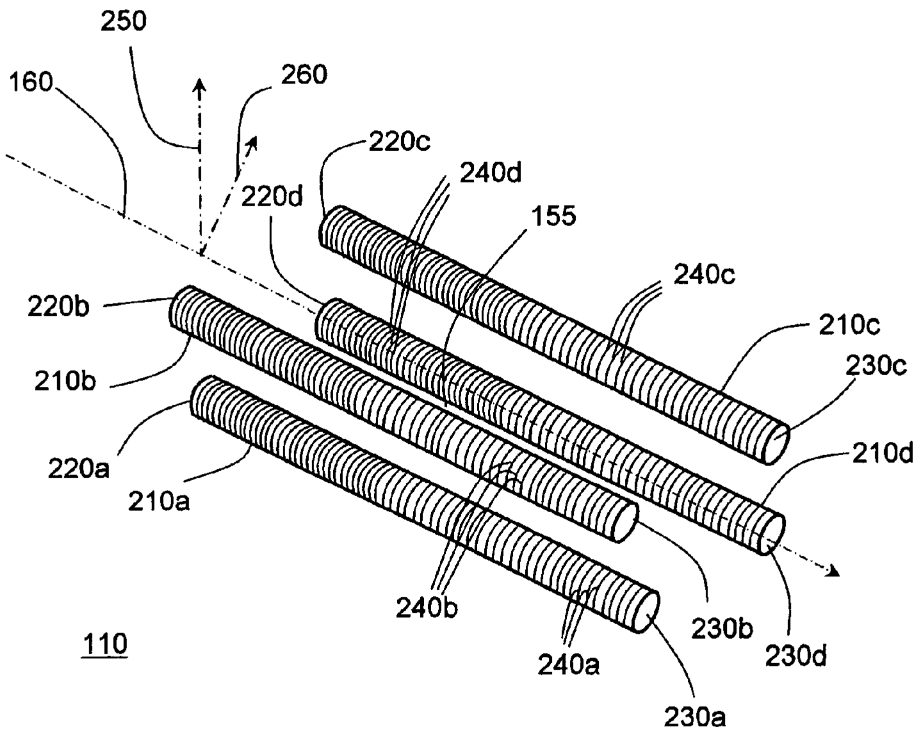
FIG. 2 is a perspective view of the RF-only multipole.

Reference being directed now to FIG. 2, there is shown a perspective view of RF-only multipole 110 having constituent rods 210*a*, 210*b*, 210*c*, and 210*d* of substantially identical construction. Each rod has a generally cylindrical shape and extends between a front or proximal end and a back or distal end. In other implementations, the rods may have a non-circular cross-sectional aspect (e.g., hyperbolic or rectangular shaped) in order to provide desired characteristics to the radial RF field (e.g., to remove or add higher-order field components) or to facilitate manufacture and reduce cost. The rods are arranged in spaced-apart, mutually parallel relation (parallel to longitudinal axis 160) and are of equal length and longitudinally co-extensive such that faces of corresponding first ends and second ends are aligned in respective planes defined by radial dimensions 250 and 260. The transverse spacing between adjacent rods is identical, such that the rod centers define a square in the radial plane. As is known in the art, multipole 110 will typically include two or more holder structures (not depicted), fabricated from an electrically insulative material such as a ceramic, which fix the spacing and orientation of the rods in the desired manner.

While the rods are depicted as being relatively widely spaced for the purpose of clarity of explication, those skilled in the art will recognize that the actual spacing between adjacent rods for a typical ion guide application will be considerably smaller than depicted in the figure. For example, an exemplary ion guide application, utilizing cylindrical rods having a cross-sectional radius of 0.125 inch, may have an inscribed circle radius (the radius of the circle tangent to the inwardly directed surfaces of the multipole rods) of about 0.109 inch.

Figure 3:
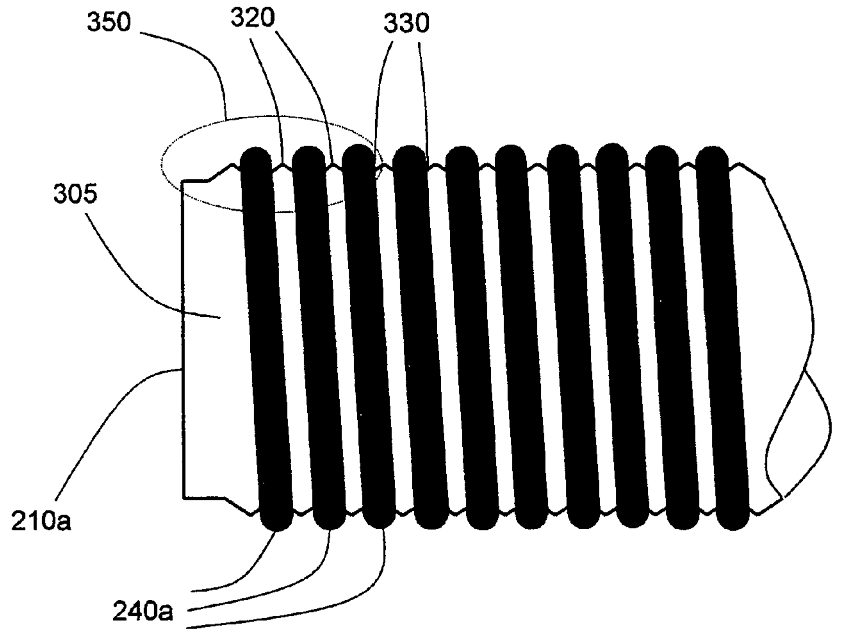
FIG. 3 is a fragmentary elevated side view of a rod of the RF-only multipole.

As indicated in FIG. 2, each rod has arranged on its surface a corresponding wire 240*a*–*d* describing a spiral path traversing the length of the rod. The wire extends between a first end positioned at or adjacent to the corresponding rod front end 220*a*–*d*, and a second end positioned at or adjacent to the rod back end 230*a*–*d*. As will be described in greater detail below, an axial DC field is created within multipole interior region 155 by applying, to each rod, a first DC voltage $DC_1$ to the first end of the wire 240 and a second DC voltage $DC_2$ (different from $DC_1$) to the second end. The applied first and second DC voltages $DC_1$ and $DC_2$ are identical for each rod. For applications wherein positively charged ions are to be guided by multipole 110, the first and second voltages will be selected such that $DC_2 < DC_1$ to establish a negative voltage gradient in the direction of ion travel; conversely, transfer of negatively charged ions will require $DC_2 > DC_1$ in order to generate a positive voltage gradient in the direction of travel. The required axial DC field strength (expressed as volts/unit length) will depend on the requirements and conditions of the specific application. In most cases, an axial field strength of 0.05–0.5 volts/ centimeter will be adequate to achieve satisfactory axial ion transfer without an unacceptable degree of ion fragmentation; for a rod having a length of 5 inches (12.7 centimeter) and an axial field strength of 0.3 V/cm, a voltage difference (absolute value of ($DC_2$–$DC_1$)) of only about 4 volts is needed. The optimal axial field strength will depend on considerations of pressure in the multipole, requirements on timing of ion transfer, and ion losses due to scattering and fragmentation, FIG. 3 is a fragmentary side view of one of the rods 210*a* of RF-only multipole 110, which is identical in its structure and configuration to the other rods 210*b*–*d* of multipole 110. Rod 210*a* consists of a generally cylindrical rod body 305 adapted with external threads 320 that extend along the full length of the rod. In an exemplary implementation, rod 210*a* is adapted with threads 320 having 80 turns/inch, i.e., a pitch (lateral spacing between corresponding points on adjacent threads) of 0.0125 inch. Wire 240*a*, fabricated from an electrically resistive material such as nichrome or tungsten, is seated in a groove 330 defined between adjacent threads 320 and thereby describes a spiral resistive path. Wire 240*a* has a first end located at or near the front end 220*a* of rod 210*a*, and a second end located at or near to the back end 230*a*. Selection of wire material and diameter (gauge) may be based on considerations of resistance (which will govern power dissipation), as well as mechanical and thermal properties. In the above-described example of a 5 inch long rod having a diameter of 0.25 inch and a thread pitch of 0.0125 inch, 33 AWG nichrome wire having a diameter of 0.007 inch and a resistance of about 12.89 Ohms/foot may be used, yielding a total resistance of about 335 Ohms and power dissipation of about 0.19 W/rod.

As noted above, the application of the DC voltages to wire 240*a* creates an axial DC gradient within multipole interior region 155 that propels ions through multipole 110. Because the identical DC potential is applied to all RF rods at any given axial position, the DC potential inside the multipole will have a uniform distribution in a radial plane orthogonal to the major axis. It is generally desirable to generate an axial DC voltage profile having a high degree of smoothness, i.e., one which closely approaches a linear profile. Significant departures from linearity may cause defocusing or bunching of the ion beam and/or have other operationally harmful effects. The degree of linearity of the axial DC voltage profile is governed primarily by the regularity and value of the lateral spacing between turns of wire 240, which results from the rod thread dimensions and geometry. Use of rods having excessively coarse threads (threads having a low number of threads/unit length) is disfavored, since the resultant axial field profile may have a significant non-linear component.

It is contemplated that in preferred embodiments the axial DC field strength will be uniform along the full longitudinal extent of multipole 110 (or a substantial portion thereof.) In certain alternative embodiments, however, it may be desirable to provide an axial field strength that varies (e.g., in a stepwise or continuous fashion) along the major axis of the multipole. This condition may be accomplished by varying the lateral spacing of the wire and/or by varying the dimensions or material of the wire (and hence its resistance/unit length) along the length of the rod.

In the embodiment depicted in FIGS. 2 and 3, wire 240*a* preferably carries both RF and DC voltages. The combined RF and DC voltages are applied to wire 240*a* by connecting the first DC voltage $DC_1$ superimposed on the RF voltage to a first location on wire 240*a* corresponding to the front end of rod 210*a* and connecting the second DC voltage $DC_2$ superimposed on the RF voltage to a second location on wire 240*a* corresponding to the rod back end. The two locations at which the voltages are connected may be, but are not necessarily, at the wire ends. The RF voltage creates (in conjunction with the RF voltage applied across the other rods) a radial RF field that radially confines ions to the interior region.

Figure 4:
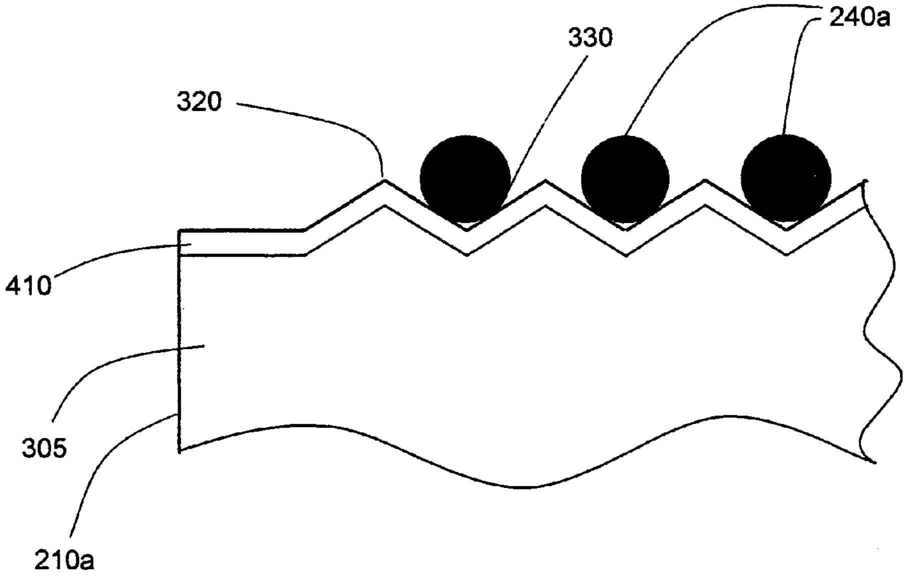
FIG. 4 is a fragmentary longitudinal cross-sectional view of a portion of the RF-only multipole depicted in FIG. 3.

In order to electrically isolate wire 240*a* from the conductive rod body 305 while also providing a strong capacitive coupling between the wire and rod body, a thin insulating layer may be formed at the outer margins of rod 210*a*. Referring now to FIG. 4, which shows a fragmentary longitudinal cross-sectional view of rod 202*a* corresponding to the area circumscribed by the dotted ellipse in FIG. 3, an insulating layer 410 is interposed between wire 240*a* and rod body 305 and serves to inhibit the direct flow of current therebetween. In a preferred implementation, the material and thickness of insulating layer 410 are selected to allow close capacitive coupling between wire 240*a* and rod body 305 such that the RF current flow in rod body 305 induces uniform RF potential at all locations on the rod surface facing inner space of the multipole and thus both the wire and rod body significantly participate in the generation of the RF field.

Insulating layer 410 may be formed by any one of a number of suitable techniques. In one implementation, rod 210*a* is made of aluminum, and insulating layer 410 is created by a hard anodization process known in the art, which causes an electrically insulative oxide layer having a thickness of approximately 50 μm to be formed adjacent the rod 202*a* surface. Alternatively, insulating layer 410 may be formed by depositing (using, for example, an evaporative or sputtering process) a thin layer of insulative material on the outside of rod body 305. In another alternative, wire having an insulative sheath or jacket may be utilized; however, it may be necessary to remove the portion of the insulative sheath not in contact with rod 202*a* in order to avoid static charge residing on the rod surface.

Figure 5:
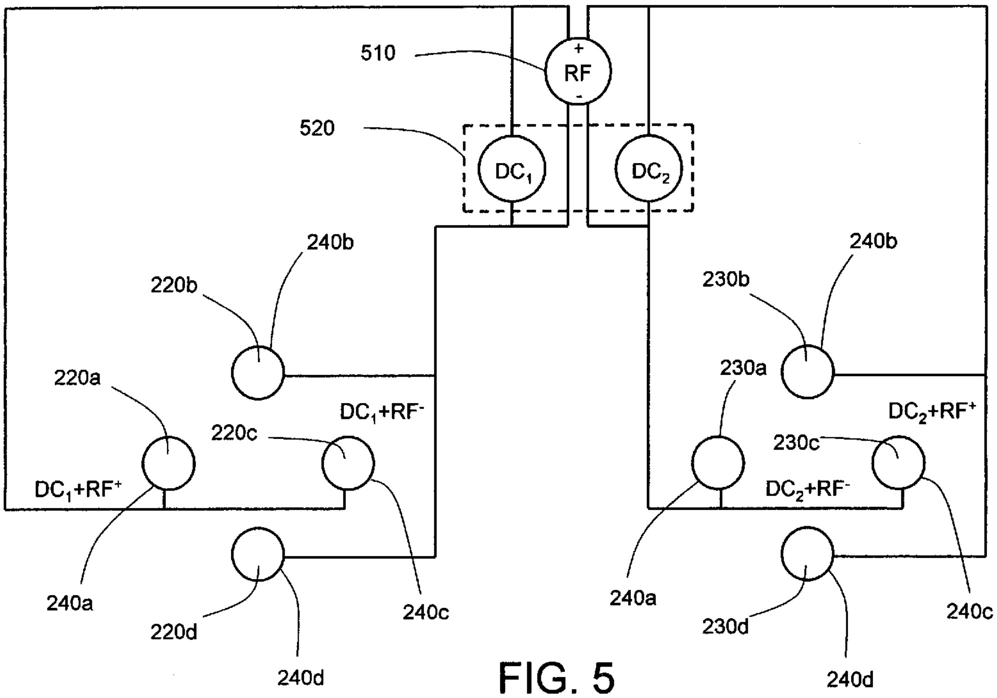
FIG. 5 is a schematic diagram of the electrical connections to opposite ends of the resistive path at the ends of the rods of the RF-only multipole.

FIG. 5 schematically depicts the electrical connections to wires 240*a*–*d* at first and second locations respectively corresponding to front ends 220*a*–*d* and back ends 230*a*–*d* of rods 210*a*–*d*. Starting with the connections at the front rod ends depicted in the lefthand portion of FIG. 5, one phase of the RF voltage (labeled as "+") supplied by RF voltage source 502 is combined with the first DC voltage $DC_1$ (supplied by DC voltage source 504) and coupled to wires 240*a* and 240*c* at a first location near front ends 220*a* and 220*c*. The opposite phase of RF voltage source 502 (labeled as "–") is likewise combined with the first DC voltage $DC_1$ and coupled to wires 240*b* and 240*d* at a location near the corresponding rod front ends 220*b* and 220*d*.

Referring now to the righthand portion of FIG. 5, the +phase of the RF voltage is combined with the second DC voltage $DC_2$ (also supplied by DC voltage source 504) and coupled to wires 240*a* and 240*c* at a second location near back rod ends 230*a* and 230*c*. The –phase of the RF voltage is also combined with the second DC voltage $DC_2$ and coupled to wires 240*b* and 240*d* at a second location near back rod ends 230*b* and 230*d*.

In another implementation, each wire 240*a*–*d* may have one of its ends placed in electrical contact with the corresponding rod body, providing identical RF and DC voltages on the wire end and rod body, while the opposite end of each wire 240*a*–*d* is electrically isolated from the rod body such that the opposite end is held at the same RF voltage but at a different DC voltage relative to the end in contact with the rod body.

DC voltage source 504 may include low pass filters or similar circuitry to remove the undesired passage of oscillatory components to DC power supply circuits. The RF and DC voltages may be combined using a transformer circuit or other method known in the art.

It is noted that application of the DC voltages to the wires 240*a–d* will cause resistive heating of the wires, the amount of which will depend on the wire resistance and the current The heat generated by wires 240*a–d* may be advantageously utilized to raise the temperature of the interior region of the multipole in order to facilitate breaking up of ion solvent/matrix clusters and/or evaporation of any remaining solvent. If a significant amount of heating is desired, then wire having a relatively low value of resistance/unit length may be utilized (since, for a given voltage difference, the amount of resistive heating will be inversely proportional to the wire resistance); conversely, if heating is disfavored, wire having a relatively high value of resistance/unit length may be employed.

Figure 7:
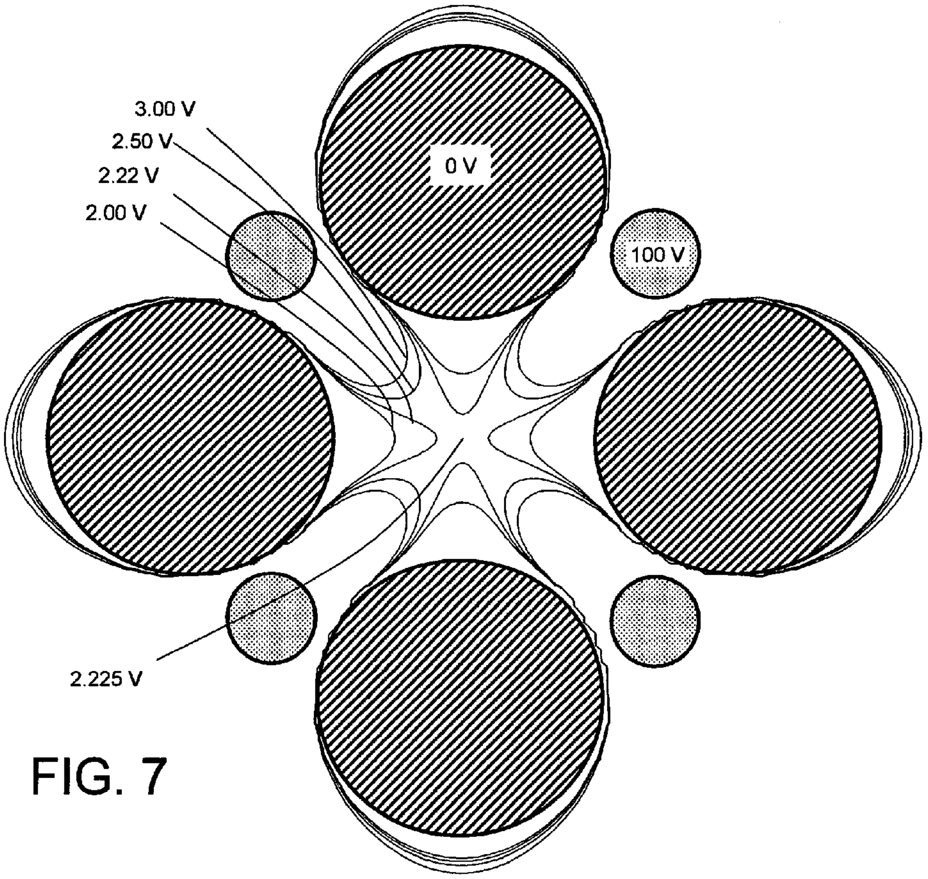
FIG. 7 is a depiction of the variation of the DC potential with angular and radial location in a prior art RF-only multipole where prior art auxiliary rod structures are employed to generate the axial DC field.
Figure 8:
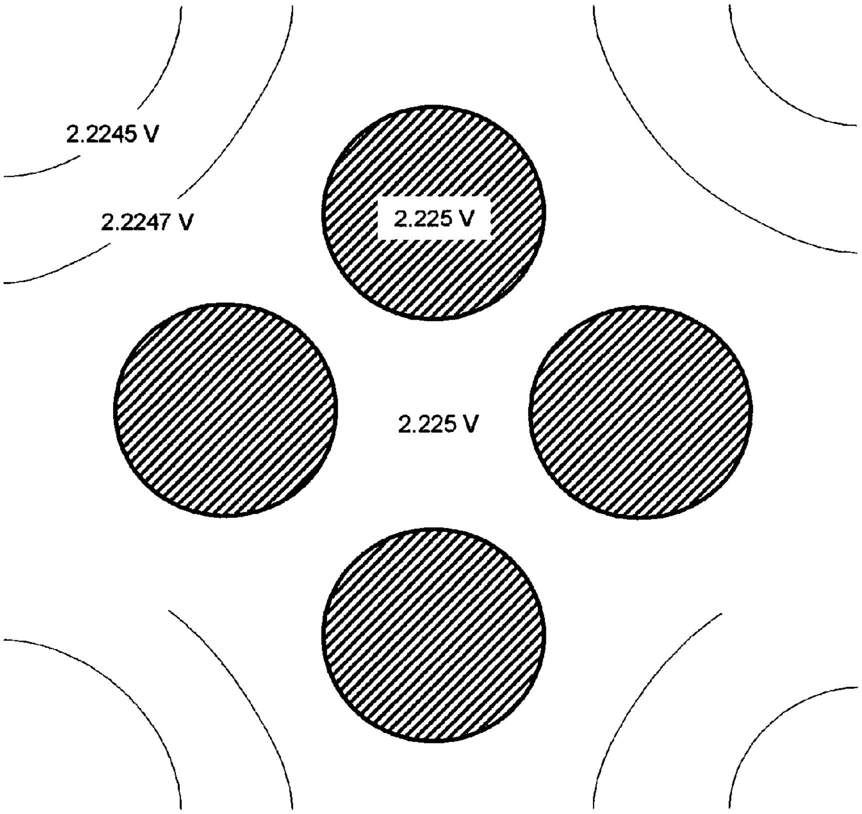
FIG. 8 is a depiction of the substantially uniform DC potential in the radial plane achieved by the RF-only multipole of the present invention.

The improvement in DC field uniformity in the radial plane achieved by employing an RF-only multipole constructed in accordance with the present invention may be better appreciated with reference to FIGS. 7 and 8. FIG. 7 depicts a representation of the radial-plane DC potential variation in a prior art RF-only multipole that utilizes auxiliary rods to produce the axial DC gradient. In this example, the central point of the multipole interior is maintained at a DC potential of 2.225 V. The isopotential lines drawn on FIG. 7, corresponding to DC potentials of 2.00 V, 2.22 V, 2.50 V, and 3.00 V, illustrate how the DC potential in the multipole interior varies significantly with both angular and radial position. As discussed in the background section, poor homogeneity of DC potential may adversely affect ion transmission efficiency, especially when large excursion of ion trajectories from the major longitudinal axis occur.

FIG. 8 depicts a representation of the radial-plane DC potential distribution in an RF-only multipole constructed in accordance with a preferred embodiment of the invention. In marked contrast to the large spatial non-uniformities present in the DC field shown in FIG. 7 and discussed above, FIG. 8 shows that the DC potential is substantially uniform (having an exemplary value of 2.225 V) within the interior region of the multipole, and does not vary significantly with radial and angular position. Isopotential lines corresponding to DC potentials of 2.2245 V and 2.2247 V illustrate that the radial DC potential gradient is relatively small even outside of the multipole interior region. In this manner, the RF-only multipole of the present invention avoids the reductions in ion transmission efficiency associated with non-uniform radial-plane DC potentials present in prior art ion guide devices.

Figure 6:
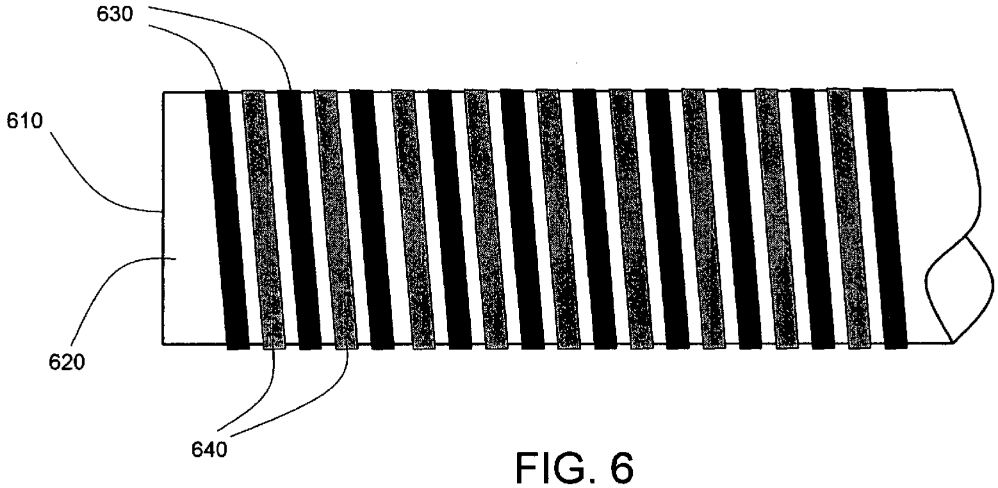
FIG. 6 is a fragmentary side view of a rod of the RF-only multipole constructed in accordance with an alternative embodiment of the invention.

FIG. 6 depicts an alternative construction of a rod 610 that may be substituted in the RF-only multipole 100 for rod 210. Rod 610 has a cylindrical rod body 620 formed from an electrically insulative material such as a ceramic. A thin film of resistive material describing a spiral resistive path 630 along rod 610 is deposited on the surface of rod body 620. A spiral conductive path 640 is created on the rod surface by depositing a thin film of highly conductive material, such as copper, gold or aluminum. Resistivity of a spiral resistive path is to be chosen high enough to avoid significant RF power losses due to capacitive coupling between two traces. Corresponding turns of the resistive and conductive paths are laterally offset by a distance sufficient to electrically isolate the paths from each other. In this construction, DC voltages are applied across the resistive path 630 to generate the axial DC field. The radial RF field, which radially confines the ions to interior region 155 is created by applying RF voltage to conductive path 640. The lateral spacing between turns of the resistive path should be sufficiently small to maintain spatial irregularities in the RF and DC fields at an operationally acceptable level. In one example, the widths of the resistive path 630 and conductive path 640 are about 300 μm, and the separation between adjacent turns of the two paths (i.e., the distance between corresponding turns of the paths) is about 200 μm. Other suitable methods may be substituted for thin film deposition to construct the resistive and/or conductive paths.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An RF-only multipole, comprising:

at least four elongated rods held in spaced apart, mutually parallel relation, the rods defining an interior region through which ions are transmitted along the major axis of the multipole, each rod having a spiral resistive path disposed around a rod body and traversing at least a portion of the length of the rod;

a radio-frequency voltage source, coupled to each rod, for establishing an RF-only field that radially confines the ions; and a direct current voltage source, for respectively applying first and second direct current voltages to first and second locations on the resistive path of each rod to generate an axial direct current field that propels the ions along the major axis.

2. The RF-only multipole of claim 1, wherein each rod comprises a threaded rod, and the resistive path comprises a wire disposed in the groove defined between adjacent threads of the threaded rod.

3. The RF-only multipole of claim 1, wherein each rod includes an electrically conductive rod body and an isolating layer interposed between the electrically conductive material and the resistive path.

4. The RF-only multipole of claim 3, wherein the rod body is formed of aluminum, and the isolating layer is an oxide layer formed by anodization.

5. The RF-only multipole of claim 3, wherein the RF-only field is established by applying a radio-frequency voltage to the rod body, the radio-frequency voltage being transferred to the wire through capacitive coupling across the isolator layer.

6. The RF-only multipole of claim 1, wherein application of the direct current potential across the resistive path causes substantial heating of the interior region of the multipole.

7. The RF-only multipole of claim 1, wherein the axial direct current field has a strength of at least 0.05 volts/centimeter.

8. The RF-only multipole of claim 1, wherein each rod is formed from an electrically insulative rod body, and the RF-only field is established by applying a radio-frequency voltage to a spiral conductive path disposed around the rod body.

9. A mass spectrometer system, comprising:

an ion source for generating ions;

a mass analyzer for analyzing the mass-to-charge ratio of at least a portion of the ions; and an RF-only ion guide for transferring ions along a segment of an ion path extending between the ion source and the mass analyzer, the ion guide comprising:

at least four elongated rods held in spaced apart, mutually parallel relation, the rods defining an interior region through which ions are transmitted along the major axis of the multipole, each rod having a spiral resistive path disposed around a rod body and traversing at least a portion of the length of the rod;

a radio-frequency voltage source, coupled to each rod, for establishing an RF-only field that radially confines the ions; and a direct current voltage source, for respectively applying first and second direct current voltages to first and second locations on the resistive path of each rod to generate an axial direct current field that propels the ions along the major axis.

10. The mass spectrometer system of claim 9, wherein each rod comprises a threaded rod, and the resistive path comprises a wire disposed in the groove defined between adjacent threads of the threaded rod.

11. The mass spectrometer system of claim 9, wherein each rod includes an electrically conductive rod body and an isolating layer interposed between the electrically conductive rod body and the resistive path.

12. The mass spectrometer system of claim 11, wherein the the rod body is formed of aluminum, and the isolating layer is an oxide layer formed by anodization.

13. The mass spectrometer system of claim 11, wherein the RF-only field is established by applying a radio-frequency voltage to the rod body, the radio-frequency voltage being transferred through capacitive coupling across the isolator layer.

14. The mass spectrometer system of claim 9, wherein application of the direct current potential across the resistive path causes substantial heating of the interior region of the multipole.

15. The mass spectrometer system of claim 9, wherein the axial direct current field has a strength of at least 0.05 volts/centimeter.

16. The mass spectrometer system of claim 9, wherein each rod is formed from an electrically insulative rod body, and the RF-only field is established by applying a radio-frequency voltage to a spiral conductive path disposed around the rod body.

17. The mass spectrometer system of claim 9, wherein the ion source is a MALDI source having a laser for desorbing and ionizing a sample.

18. The mass spectrometer system of claim 17, wherein a beam path of the laser extends partially into the interior region of the ion guide.

19. The RF-only multipole of claim 1, wherein the DC potential within the interior region is substantially uniform in a radial plane orthogonal to the major axis.

20. The RF-only multipole of claim 1, wherein the DC voltages are combined with RF voltages prior to application to the multipole.

21. The mass spectrometer system of claim 9, wherein the DC potential within the interior region is substantially uniform in a radial plane orthogonal to the major axis.

22. The mass spectrometer system of claim 9, wherein the DC voltages are combined with RF voltages prior to application to the multipole.

* * * * *